US008386918B2

(12) United States Patent
Do et al.

(10) Patent No.: US 8,386,918 B2
(45) Date of Patent: Feb. 26, 2013

(54) RENDERING OF REAL WORLD OBJECTS AND INTERACTIONS INTO A VIRTUAL UNIVERSE

(75) Inventors: Lydia M. Do, Raleigh, NC (US); Pamela A. Nesbitt, Tampa, FL (US); Lisa A. Seacat, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 1004 days.

(21) Appl. No.: 11/951,889

(22) Filed: Dec. 6, 2007

(65) Prior Publication Data

US 2009/0150802 A1    Jun. 11, 2009

(51) Int. Cl.
G06F 17/00 (2006.01)
G06F 17/20 (2006.01)
G06F 17/21 (2006.01)
G06F 17/22 (2006.01)
G06F 17/24 (2006.01)
G06F 17/25 (2006.01)
G06F 17/26 (2006.01)
G06F 17/27 (2006.01)
G06F 17/28 (2006.01)
G06F 3/048 (2006.01)

(52) U.S. Cl. .................. 715/230; 715/706; 715/757
(58) Field of Classification Search ................ 715/230, 715/706, 757
See application file for complete search history.

(56) References Cited

U.S. PATENT DOCUMENTS

| 5,990,900 | A * | 11/1999 | Seago | 345/427 |
| 6,259,568 | B1 * | 7/2001 | Rybczynski | 359/676 |
| 7,065,711 | B2 | 6/2006 | Hata et al. | |
| 7,523,411 | B2 * | 4/2009 | Carlin | 715/782 |
| 7,800,592 | B2 * | 9/2010 | Kerr et al. | 345/173 |
| 8,065,623 | B2 * | 11/2011 | Bohlman | 715/768 |
| 2001/0044858 | A1 * | 11/2001 | Rekimoto | 710/1 |
| 2002/0109719 | A1 * | 8/2002 | Hata et al. | 345/748 |
| 2004/0175680 | A1 | 9/2004 | Hlavac et al. | |
| 2005/0140670 | A1 * | 6/2005 | Wu et al. | 345/419 |

(Continued)

FOREIGN PATENT DOCUMENTS

WO    WO 03/058518 A2    7/2003

(Continued)

OTHER PUBLICATIONS

Lok, B.; Naik, S.; Whitton, M.; and Brooks, F.P., Jr., Effects of Handling Real Objects and Avatar Fidelity on Cognitive Task Performance in Virtual Environments, Virtual Reality, 2003, Proceedings, IEEE, Mar. 22-26, 2003,pp. 125-132, Charlotte, NC, USA.

(Continued)

*Primary Examiner* — David Phantana Angkool
(74) *Attorney, Agent, or Firm* — Khan Tran; H. Daniel Schnurmann

(57) ABSTRACT

Systems are disclosed herein that can capture image data reflecting real world objects and/or actions and convert this data into a format that, is usable in a virtual universe (VU). Thus, image data representing real world/actual objects and actions can be acquired, converted into virtual universe compatible data, sent to a VU server where the actions and objects can be associated with a virtual area or an avatar, and a recreation of the objects and actions can be displayed to a user in the VU. This allows a participant to customize activities and objects in the VU, and provide a unique "personality" for their avatar and their VU. Other embodiments are also disclosed.

15 Claims, 3 Drawing Sheets

U.S. PATENT DOCUMENTS

| | | | |
|---|---|---|---|
| 2005/0162419 A1* | 7/2005 | Kim et al. | 345/419 |
| 2006/0097991 A1* | 5/2006 | Hotelling et al. | 345/173 |
| 2008/0122796 A1* | 5/2008 | Jobs et al. | 345/173 |
| 2009/0066670 A1* | 3/2009 | Hotelling et al. | 345/174 |
| 2009/0096757 A1* | 4/2009 | Hotelling et al. | 345/173 |
| 2009/0109180 A1* | 4/2009 | Do et al. | 345/173 |
| 2009/0147003 A1* | 6/2009 | Do et al. | 345/427 |
| 2009/0147008 A1* | 6/2009 | Do et al. | 345/473 |

FOREIGN PATENT DOCUMENTS

| | | |
|---|---|---|
| WO | WO 2007/098560 A1 | 9/2007 |

OTHER PUBLICATIONS

Izadi, S.; Agarwal, A.; Criminisi, A.; Winn, J.; Blake, A.; and Fitzgibbon, A., C-Slate; A Multi-Touch and Object Recognition System for Remote Collaboration Using Horizontal Surfaces, Hortizontal Interactive Human-Computer Systems, 2007. Tabletop '07. Second Annual IEEE International Workshop on Horizontal Interactive Human-Computer System, Oct. 10-12, 2007, pp. 3-10, Newport, RI, USA.

* cited by examiner

RENDERING OF REAL WORLD OBJECTS AND INTERACTIONS INTO A VIRTUAL UNIVERSE

FIELD

The present disclosure relates generally to a virtual universe (VU) and more particularly to acquiring data associated with real world objects and/or interactions and rendering such real world objects and interactions in a virtual universe based on the acquired data.

BACKGROUND

Operating in a virtual environment utilizing a computer is a pass-time that is gaining popularity. A virtual environment is an interactive simulated environment accessible by multiple users who can interact through an "online" interface using a network client. One deficiency with VUs is that the environment and items in the environment is not easily customized.

User friendliness of computers continues to be enhanced by better user interfaces. User interfaces for computers systems have evolved significantly since the personal computer (PC) first became widely available. Early PCs used rather primitive user input devices, where a single keyboard was the only human input mechanism. The vast improvement in microprocessors, available memory, and programming functionality have all contributed to the advancement of user interface designs and the development of user friendly graphic based operating systems and hardware.

One particular area of advancement in user interface technology pertains to surface computing technology. Surface computing allows any number of users to interact with a computer through an interactive surface. The computer can render a graphical user interface ('GUI') on the surface and multiple users may manipulate GUI displayed "objects" directly with their hands using multi-touch technology as opposed to using traditional input devices such as a mouse or a keyboard. In such a manner, the devices through which users provide input and receive output are merged into a single surface, which provide an intuitive and efficient mechanism for users to interact with the computer. As can be appreciated the combined software and hardware technology of the interactive surface can allow a user, or multiple users, to manipulate digital content by the use of natural motions, hand gestures, of physical objects.

As surface computing becomes more ubiquitous in everyday environments, advancements in how users interact with a surface computing device to efficiently perform tasks may show remarkable improvements over traditional input devices such as a keyboard and mouse. Such a system is commonly referred to as a multi-touch interactive system. Such a system can include a touch screen or touch tablet (touchpad) that recognizes multiple simultaneous touch points and typically has software to interpret such simultaneous touches. Such a system can also communicate with wireless devices such as Bluetooth compatible devices, devices equipped with radio frequency identification (RFID) technology and wireless cameras.

There are several detection technologies that may be utilized for detection of devices by a multi-touch interactive system. Optical-based and infrared based proximity detection techniques have been developed to recognize objects that are either in contact or proximate to the multi-touch surface. In addition object recognition sensors such as bar code readers have also been adapted to work with multi-touch surfaces.

With regard to virtual universes, users can inhabit and interact in the virtual environment via avatars, which can be two or three-dimensional graphical representations of human or non-human form. Alternately described, an avatar can be a graphical representation that a user selects for others to see while in the same virtual environment. An avatar can assume various graphical representations such as that of a human character, animal character, an icon, abstract personas, and so on.

Virtual environments have many different names. For example, a virtual environment can be referred to as a "metaverse,", "3D Internet", "virtual world", and so on referred to herein as a virtual universe (VU). Although there are many different types of virtual environments, there, are several features many VUs have in common. For example, many VUs have a shared space, which is a "universe," for many avatars to reside in as they concurrently participate in an activity. The VU avatars can traverse, inhabit, and interact with other avatars via 3-D graphics and landscapes. Thus, a VU can be populated by many thousands of residents or avatars. Often, the VU resembles aspects of the real world in terms of physics or physical laws, houses, and landscapes, etc.

An agent can be a user's account, upon which the user can build an avatar, and which is tied to the inventory of assets the user owns. A region can be a virtual area of and within the VU, typically residing on a single server. Assets, avatars, the environment, and anything visual can have UUIDs (unique universal identifier) that are associated with geometric data, among other data. The geometric data can be distributed to users as textual coordinates. Textures can be distributed to users as graphics files, which are placed within the boundaries of specified textual coordinates. Effects data can be rendered by the user's client according to the user's preferences and user's device capabilities. Lastly, socialization and/or community features allow and encourage the formation of social groups such as teams, guilds, clubs, cliques, housemates, neighborhoods, etc.

Residents can be personas or representations of the users of the VU, and residents can roam all about the virtual region by walking, driving, flying, or even by teleportation or transportation, which is essentially moving through space from one point to another in the VU, more or less instantaneously. The VU can also include things that do not presently exist in real life. An avatar can have a wide range of business and social experiences while interacting with the VU. Such business and social experiences are becoming more common and increasingly important in on-line VUs.

There are many different services that provide VUs via the World Wide Web. For example, Second Life, Entropia Universe, The Sims Online, There, and Red Light Center all provide some form of VU, and these service providers have trademark rights in such names. VUs can also, provide multiplayer online games such as EverQuest, Ultima Online, Lineage, or World of Warcraft, and likewise such service providers have trademarks in such name. One popular VU mentioned above available is "Second Life" (Second Life is a trademark of Linden Research in the United States, other countries, or both). The Second Life client program provides its users (referred to as residents) with tools to view, navigate, and modify the Second Life world and participate in its virtual economy. Second Life and other on-line VUs present a tremendous new outlet for both structured and unstructured virtual collaboration, gaming, exploration, advertising, and travel, as well as real-life simulations in virtual spaces.

Many VUs also have a graphical user interface (GUI). The GUI can depict the VU or some form of "space" visually, ranging in style from 2D "cartoon" imagery to a more immersive 3D environment. In addition many virtual environments provide immediacy, interactivity, and persistence. Immediacy allows interactions between a user's avatar and the environment to take place in real time. Persistence provides a continuous environment regardless of whether individual users are logged in.

Interactivity with the environment allows users to alter, develop, build, or submit customized content to a limited degree. As stated above, the types of objects that an avatar can possess and the types of actions an avatar can carry out are limited. The ability to customize such objects, actions and gestures is also less than perfect. Furthermore, the graphical rendering of available objects, actions and gestures in the VU is limited.

SUMMARY OF THE INVENTION

The problems identified above are in large part addressed by the systems, arrangements, methods and media disclosed herein that allow a participant to acquire pixel data reflecting real world objects, and actions and convert this pixel data, into a format that is usable in a virtual universe (VU). Thus, image data representing real world/actual objects and actions can be acquired, converted into virtual universe compatible data, and sent to a VU server where the actions and objects can be associable or associated with a virtual area or an avatar. The VU server can recreate the objects and actions and can be display such objects and actions in the VU. This allows a participant to customize activities and objects in the VU, and provide a unique "personality" for their avatar in the VU.

In some embodiments, objects, actions and interactions with objects can be recognized by a multi-touch interactive system and these items and interactions can be classified into a category such as an object that belongs on a wall or a floor, something that an avatar can carry or something that an avatar can do. These items and activities can be converted into a virtual universe engine compatible format such that the items and interactions can be simulated by the VU service provider. The participant can then receive a VU with the simulated items and actions. The multi-touch interactive system can simultaneously recognize dozens and dozens of movements such as a touch or a gesture and can obtain a digital image of objects and interactions.

In some embodiments, a method is disclosed that locates a participant, configures a multi-touch interactive system to receive input from the participant, scans for an object or an action or both, acquires image data representative of the object and/or interaction and converts the image data into VU compatible data. The method can also include transmitting the graphical data to a VU server. In some embodiments, the method can include assigning an identifier to the VU compatible data such that the VU compatible data can be associable or associated with an avatar.

In some embodiments, a participant's gesture such as a facial expression can be simulated as a gesture of an avatar in the VU. In other embodiments data acquired on the object can be simulated as a possession of an avatar linked to the participant. If the system does not recognize the input or what should be done with the input, the system can query the participant and acquire participant input regarding what the object or interaction is and where the object and/or interaction should be placed in the VU. Then, the object and/or interaction can be placed in, or simulated in the VU. In some embodiments, the data related to the object can be utilized to alter or customize an object or action that already exists or is already available in the VU. Further, the system can allocate space on the multi-touch interactive system to accept input from the identified participant. The system can also accept user input, to classify the acquired object and/or interaction.

In some embodiments, a system to transition objects and actions from the real world to a VU is disclosed. The system can include a multi-touch interactive system to acquire data on objects and actions provided by a human participant. An object-interaction acquisition module can acquire data responsive to the object and/or interaction. An identification module can take input from the multi-touch interactive system and can identify a participant associated with the object and/or action. In some embodiments, an association module can associate the object and/or interaction with the participant, and a translator module can translate the acquired data into a VU compatible format.

Accordingly, methods to add objects in a VU, and/or to customize objects in the VU are disclosed. In some embodiments, a participant, can be identified and the system can allocate space on a multi-touch interactive system for participant input. The participant can then invoke an object and/or interaction entry mode on their allocated space on an area of the multi-touch interactive system. The participant can make a gesture as an action or interaction to be simulated in the VU and the multi-touch interactive system can acquire data representing such an action. The acquired data can be converted into a data format that is usable by a VU server. The VU server can then provide a VU with the "re-created" or simulated action or object.

BRIEF DESCRIPTION OF THE DRAWINGS

Aspects of the invention will, become apparent upon reading the following detailed description and upon reference to the accompanying drawings in which, like references may indicate similar elements.

DETAILED DESCRIPTION

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Systems, arrangements, methods and media are disclosed herein where image data representing objects and/or interactions or any combination thereof, can be acquired and can be converted into data that is usable in a VU. In some embodiments these items, interactions with items and activities of participants can be recognized by a multi-touch interactive system and these items and interactions can be classified into a categories regarding where the data can be utilized.

The acquired data can be converted into a virtual universe engine compatible format such that real world objects and/or interactions can be rendered by a VU service provider and a VU client. Rendering, as defined herein can be a process of generating a graphical model from data (possibly metadata) that can identify an object or an action. The graphical model can be a description of an object or action that can be stored in a data structure. The data structure could contain geometry, viewpoint, texture lighting, and shading information. The image can be considered as a digital image or a raster graphics image.

Rendering can also include the process of calculating effects from video file data to produce a video output. Metadata can include data that can be utilized to identify, describe, and locate resources such as data that can be utilized to create a graphical model. For example, subject gateways provide information (metadata) about individual Web sites, typically including the author, the title, the URL (Web address) and a brief description. A library catalogue contains metadata about books and other resources in the library. The participant can then view and interact in a VU with the recreated or simulated items and actions. The multi-touch interactive system can simultaneously recognize dozens and dozens of movements or interactivity such as touch, gestures and can obtain a digital image of the object.

Figure 1:
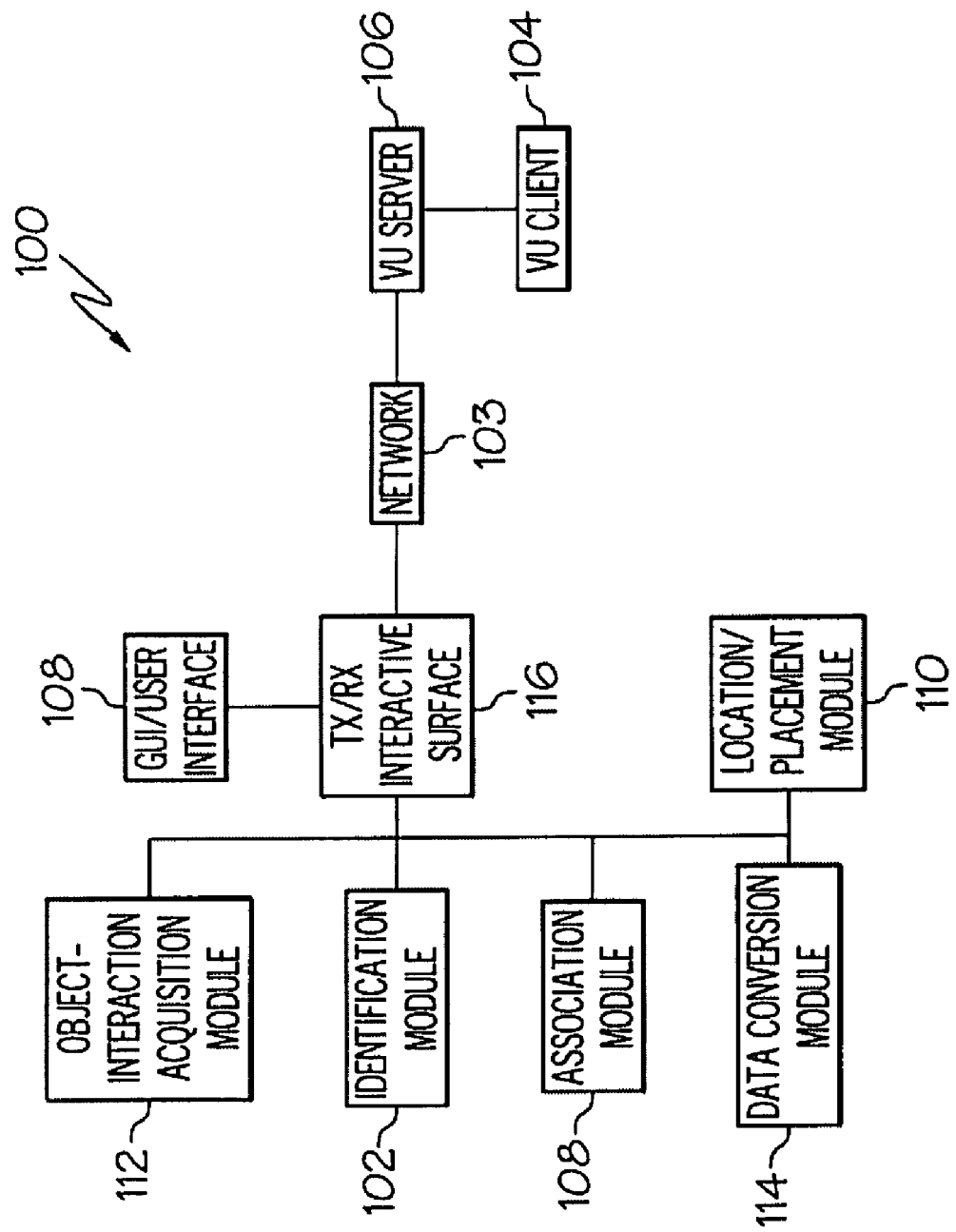
FIG. 1 is a block diagram of an image data acquisition system with a data converter.

Referring to FIG. 1 a real world data acquisition system 100 with data conversion is disclosed. The system 100 can include an interactive surface 116 with a transmitter and a receiver, an object-interaction acquisition module 112, an identifier module 102, an association module 108, a location\placement module 110, a graphical user interface/ user interface module 108 and a data conversion module 114. The interactive surface 116 can acquire image data including picture type data and video data. The image data can represent a single picture or frame, or the image data can include a series of frames that can be combined in succession to create video. Thus, image data as utilized herein refers to both a picture and to video. Such data can be pixel data that can be rendered in a VU.

The multi-touch interactive system 116 can acquire image data from objects and/or interactions of humans and can convert this image data to coordinate data or to data having a format that is usable by the VU server 106 to render the object, and/or interaction in a VU. The interactive surface 116 can transmit the converted data to the VU server 106 via a network 103 and the VU server 106 can incorporate the acquired data into a VU or a VU feed. The VU coordinate data can be sent to a VU client 104 for display to a VU user. The VU client 104 can reside on a personal computer and the VU client 104 can process and display the VU to a user. The VU client 104 and the VU server 106 can be remotely located from the multi-touch interactive system 116.

Examples of well known computing systems, environments, and/or configurations that may be suitable for use with the VU client 104 and the VU server 106 may include, but are not limited to, personal computers, server computers, thin clients, thick clients, hand-held or laptop devices, multiprocessor systems, microprocessor-based systems, set top boxes, programmable consumer electronics, network PCs, mini-computers, mainframe computers, distributed computing environments that include any of the above systems or devices, and the like.

The exemplary computers may be described in the general context of computer-executable instructions, such as program modules, being executed by a computer. Generally, program modules include routines, programs, objects, components, logic, data structures, and so on, that performs particular tasks or implements particular abstract data types. The exemplary computers may be practiced in distributed computing environments where tasks are performed by remote processing devices that are linked through a communications network. In a distributed computing environment, program modules may be located in both local and remote computer storage media including memory storage devices.

In one embodiment, the multi-touch interactive system 116 can detect an object such as a device placed on the surface 116 that has a distinct or identifiable profile or an identifiable attribute and can tag the data with the class of objects it belongs to. Such a detection process can use digital signal processing on pixel data and perform edge detection and other recognition methods. Such a detection process can also include intercepting a wireless transmission from a device in proximity to the surface and identifying the device or classifying the device based on the transmission. In some embodiments the object can have wireless camera technology, radio frequency identification (RFID) technology or Bluetooth technology where the object-interaction module 112 has a transceiver to facilitate acquiring object image data from such wireless devices. In some embodiments, the surface 116 can get a three dimensional scan of the object using radio waves or optics which, in some cases can provide more accurate recognition.

The object-interaction acquisition module 112 can also identify actions of a human such as a wave, thumbs up signal or a "we are number one" hand signal. In addition the object/ action recognition module 112 could recognize a frown a smile face or a yawn as the participant places her face on and looks into the interactive surface 116. After an object and/or interaction with an object is identified, the data conversion module 114 can transform the data that represents real world items and activities into data that is usable by a VU application residing on the VU server 106. Accordingly, the items and activities monitored in the real world can be recreated in some form in the VU.

In some embodiments, the VU server 108 will send geometric or coordinate data to the VU client 104. Alternately described, a VU server 108 can send data that can be converted and rendered as geometries and textures to the VU client 104. This is distinct from streaming pixel data or video data. Thus pixel data or image data can be converted to coordinate data by the data conversion module 115 before it is sent to the VU server 106.

The system 100 can allow multiple users to concurrently enter objects and/or actions. For example, the object may be a drink and the action may be drinking the drink, of the object may be a mobile telephone and the action may be answering and talking on the mobile telephone. In addition, a gesture may be coupled with the Object such as burping or smiling after taking a drink from a can of soda.

Identification module can associate participants with an object, an action and/or a gesture. In some embodiments, the object and/or interaction be assigned an identifier and the identifier can be sent with the data to the VU server 106 such that the VU server knows where to place the object and/or interaction. The ability to "recreate" real world objects in the virtual world can allow for users of VUs to personalize the VU in which they interact.

Such "new" objects in the VU can also allow for personalized interactions between avatars in the VU. It can be appreciate that an exact replication of the object or action is not necessary, as a simulation of a similar object, action or gesture could be provided. For example, the object could be a cup and could be classified by the system as a beverage container. In some embodiments the system could find and retrieve image data tagged as a beverage container and could user data from a library to provide such ah object in the VU where the participant desires.

Figure 2:
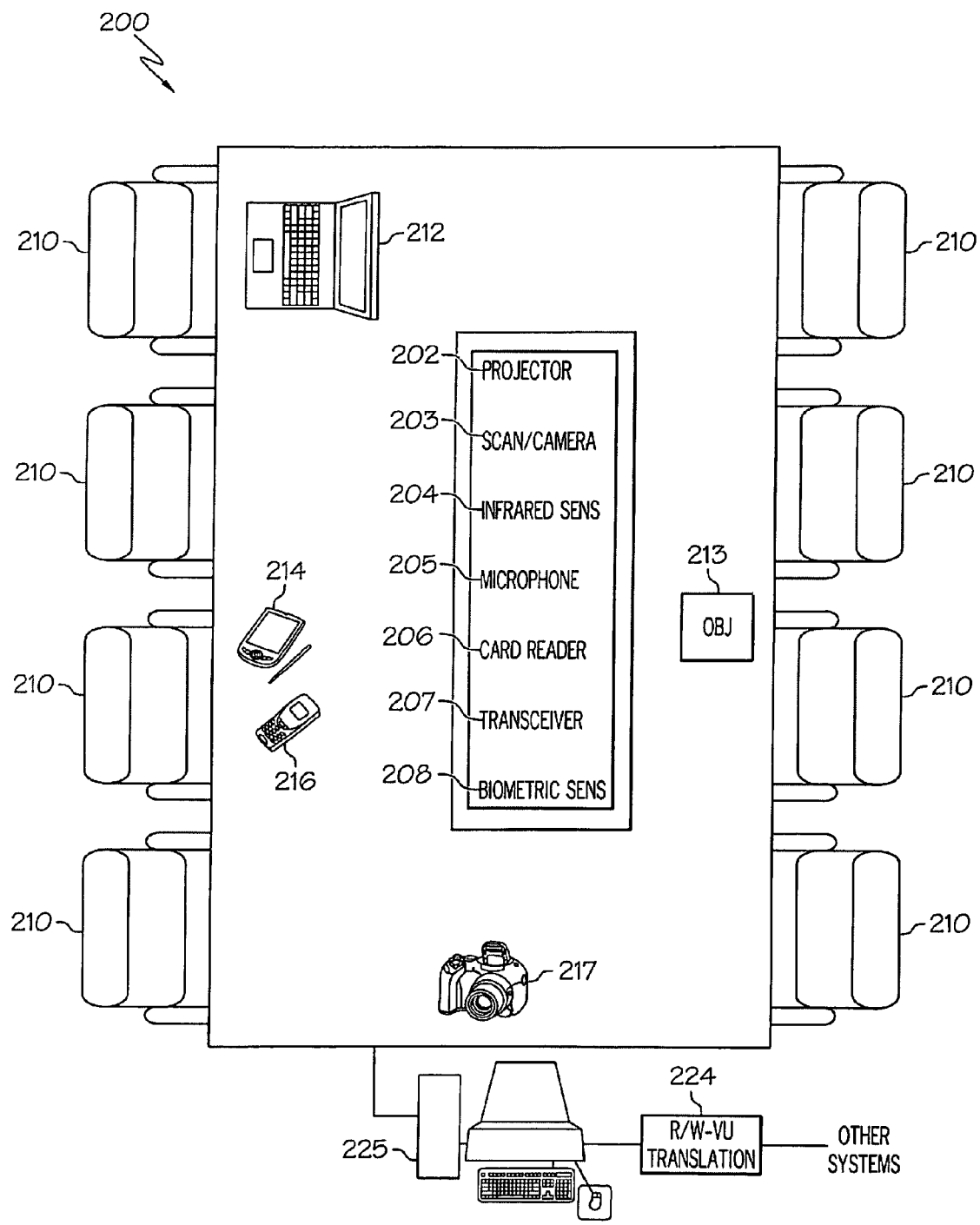
FIG. 2 is a top view of a multi-touch interactive system with objects and participants.

Referring to FIG. 2, a top view of an interactive surface system 200 with participants 210 sitting around the interactive surface of the multi-touch interactive system 200. The system 200 can include many attribute acquisition modules such as projector 202, a camera, a pixel generator, or an image acquisition module 204, an infrared sensor 204, a microphone 205, a card reader 206, transceiver 207 and ultrasound/X-ray module 208 to name a few (referred to herein as object/action acquisition modules (202-208). The object/action acquisition modules 202-208 can be connected to a surface, computing module 225 and to real world to virtual world data translation module 224, Participants 210 can provide objects and/or actions and the system 200 can capture data that represents these objects and/or actions.

In some embodiments, the interactive surface 200 does not need to know specifics of the participant 210 and can be concerned only with an object, entity or thing associated with the participant 210 such as laptop computer 212, object 213, personal digital assistant 214, mobile phone 216, camera 217, or any object herein referred to as objects (212-217). Proximity between the participant location and the object/actions can be utilized to link the object/and/or action to the participant 210. Objects can be recognized by scanning the profile of the object and comparing the acquired profile to a library of profiles. In other embodiments the object may be recognized by reading a barcode on the item.

Thus, attribute acquisition modules 202-208 can, in some modes listen for transmission from or even query objects 212-217 and can acquire data from and about the objects via pictures, video, audio, electronic transmissions, etc. and can use such data to determine what the object is. Multi-touch interactive system 200 can take the form of the "Surface Table," a product available from Microsoft Corporation. Such a table can have the ability to display graphic images and exchange information between multiple participants 210 and between multiple participant devices, Surface Table is a trademark of Microsoft Corporation. It can be appreciated that the multi-touch interactive system need hot be in the form of a horizontal table top. The principles described in this description suitably also can include and apply to multiple display surfaces or display surfaces having different shapes and curvatures mounted in orientations other than a horizontal orientation.

In some embodiments a picture could be placed on the surface, or the participant 210 could draw on the surface and the participant 210 could then dictate via a GUI on the table how the data acquired in such a process is to be utilized in the VU. In another example, a particular series or unique series of hand, arm of facial gestures could be provided by the participant. In such an embodiment, the object-interaction module could detect such a movement by a participant. The object-interaction module could be one or a combination of sensors such as a touch sensor, a motion sensor, an ultrasonic sensor, an X-ray sensor, a magnetic resonance imaging sensor, an audio sensor, a heat or infrared sensor, a video device, and a biometric sensor.

Sensor data could be processed to determine what object or action has been provided by the participant and acquired. Such processing can include edge detection, shape detection, or other known recognition techniques. For active objects such as cellular telephones, reception of a digital transmission could be utilized to identify the object and in other embodiments an optical identification such as a bar code could be read from the object. In yet other embodiments, both a shape of the item and an identification tag such as a bar code can be read by the multi-touch interactive system.

In some embodiments, participants proximate to a multi-touch can be identified by the multi-touch interactive system. The multi-touch interactive system can also determine a relative location of the identifier participants. Based on this relative location, the multi-touch interactive system can detect actions of the participant or can associate objects with the participant. Such gestures could include a participant drawing or sketching with their finger on the surface table as described above.

The data entry process could be menu driven on a graphical user interface provided by the multi-touch interactive system. For example, a participant could request a real world to virtual world conversion, and in response the surface table could acquire a relative position of the participant at the table. Then, the GUI could prompt the user for a type of input such as an object input, a gesture input, an action input or an object-action type input. In other examples, the multi-touch interactive system may be set up to accept a sketch provided by the participant. The GUI may set up the system to scan a photo or scan an object in three dimensions. In another configuration, the GUI can be utilized to recognize gestures such as facial expressions, arm, finger, or hand movements proximate to the surface such that the surface can obtain a digital interpretation of the interaction/gesture. Actions could, include waving, tapping, thumbs up sign, and OK hand signal etc. Facial expressions can include a smile, a frown, a surprise, fright etc.

In some embodiments, the participant can set up the multi-touch interactive system up, via the GUI, to scan or recognize items. The surface can associate the items with a participant and can associate the item with the participant's avatar. Thus, actions and objects detected by the multi-touch interactive system can be associated with the identified participant and the participant's avatar, if applicable. In some embodiments, the surface could communicate with a camera proximate to the surface (possibly a wireless camera) and a participant could select a photo that has been downloaded from the camera and the participant could select an object that appears in the photo. Such a selection could be done by displaying the pictures on the surface and then allowing the user to place his or her finger on the object in the photo to select an object in a picture. The object recognition module could use edge detection and color detection and other digital processing techniques to identify the item/object or at least place determine what class of items the object can be associated with.

The data that is acquired by the surface can be translated by RW-VW translation module 224 into a data format that compatible with a VU server input format. Such a format may include coordinate type data. Then, the VU server can simulate, or incorporate the acquired actions and/or objects in a VU that is displayed to a user by a VU client on a personal computer. Alternately described, selected objects, interactions of the participants with objects, and activities or gestures made by a participant can be replicated in a VU. The acquired object/activity can be associated with a particular virtual area or an avatar in the VU based on a participant configurable setting.

The surface table can accept, many inputs at any given time, and thus, can associate the acquired object or action with a participant and can, in some embodiments determine which objects or body parts are under the control of a participant. In one embodiment, an object placed on the surface proximate to a location that has been allocated to the participant can be considered as "under the control of the participant." Then this object can be "replicated" as close as possible in the virtual environment in relation to the participant's avatar. If the object is an object that is commonly carried by a person the system can assume that the participant wants her avatar to be carried by the avatar.

In some embodiments, the VU can be displayed to participants on the surface. The surface can also have a sub-window of a GUI that allows the user to select objects, manipulate objects and place the object into desired locations. For example, participants can select and/or can be provided with a restaurant setting VU. Via the GUI, the participants can create virtual personas/avatars at the table or load their own existing character by injecting and object and/or interaction into the VU.

In some embodiments, the GUI can provide a menu of objects or of object classifications and the participant could select an object and point to a location in the VU and the object could be placed in the VU. The participant could also dictate if the added object moves with the avatar as a possession of the avatar or is placed on a wall or a table within the VU.

In other embodiments, the participant could select an object type via the GUI then place a photo or an actual item on the surface, wherein the surface could acquire digital image representing the object and based on this input the system could classify the digital image of the Object into a category. Knowing what category the object falls into could be utilized by the system place the object into the VU. The system could also perform additional image processing to make the new object look as though it "belongs" in the VU. One form of image processing could be to scale the object to the appropriate size for the VU. In one embodiment, the user could select the size of the object to be inserted into the VU. This feature could be provided after object was inserted into the VU and the user could see if the object is of is not the desired size.

Accordingly, a user could place an object on the multi-touch interactive system and be prompted by a GUI displayed on the multi-touch interactive system as to what the object. Based on the scan of the object and the type of object the system cold automatically determine where the object should be placed in the VU and the object could be simulated in the VU. In other embodiments, identifying what the item is could be done by a recognition module.

In one embodiment, the disclosed arrangements could be utilized to monitor activities taking place in a room. In addition the activities could be recorded in a VU format for later viewing. For example, a user could order a drink while sitting at multi-touch interactive system that doubles as a restaurant table. When the waitress places the drink on the surface, the multi-touch interactive system can record placement of the drink, process image data of the drink and can convert the data into VU compatible data such that the drink and its placement can get simulated in the VU. Contained in such data can be a unique universal identifier for art avatar assigned to the participant. In some embodiments, the participant could dictate that her avatar could be holding the drink that was ordered and delivered in the hand of the avatar or that the drink could be placed on a table.

In another example, a user can place a mobile phone on the multi-touch interactive system in real life and the phone can be placed in participant's hand in the VU. Thus, the participant's avatar can automatically be equipped with a "mini version" of the phone. In accordance with the real world to virtual world conversion, interactions between the participant and the phone can be reflected/simulated in the VU. For example, while the phone is resting on the table and an incoming call is received, the participant can answer the phone, corresponding data can be sent to the VU server and in the VU the avatar can be shown as busy or inactive possibly talking on the phone while the participant steps away from the table to answer the incoming call. It can be appreciated that many interactions proximate to the multi-touch interactive system can be simulated in the virtual environment and how these interactions occur (what gets place in the VU and how) can be controlled by the participant.

In another example, a participant can play a song on their digital audio player and, when a user wants to play a song for their friends seated at the table, the user can place their digital audio player on the multi-touch interactive system and play the song. In response to playing the song, in the VU avatars could gather and listen to the same song, that is being played or was played in the real world. This meeting of avatars could be performed base on a user selectable setting. In this example, other user selectable settings/preferences could include invoking the avatars to dance when listening to the music in accordance with the tempo and beat of the song.

In another embodiment a participant can, via a GUI displayed on the multi-touch interactive system configure, the surface such that it accepts and stores what is "drawn" on the multi-touch interactive system by a participant. Via interactions with a GUI displayed on the surface, a participant can configure the multi-touch interactive system to accept a rendition of an object drawn by a participant with her index finger. In one example, a user may want to place something in the VU. Via the GUI the user could draw a flower on the surface and could tap her finger on the surface where she wants the flower to be placed.

Absent a participant communicating with the system regarding what is being drawn and where it should be placed, when a user draws their rendition of their favorite flower, the surface and the virtual universe may not, and does not necessarily know what the object is and where to place the object. When pixel data on an "unidentified/unrealtable" object is acquired the system can take many different approaches.

In some embodiments the unidentifiable/unrelatable object can then be sized appropriately and assumed to be a possession of the participant's avatar in the VU. In other embodiments, the participant could enter commands via the multi-touch interactive system on how to process/treat the unidentified/unrelatable object. For example, the participant or the system could frame the flower and could place this art work on the wall to showcase it to other avatars. It can be appreciated that the arrangements disclosed allow a participant to enter customized items, objects and/or interaction into the VU such that the VU and interactions with the VU can be customized according to a participant's desires.

In some embodiments, the data could be converted such that it is compatible with network based games. For example, the characters can be a "Mii" character such as those used in the "Wii" video game product manufactured by Nintendo Corporation. A Mii is, generally an avatar created by Nintendo for a Wii, Mii channel. After a user creates a Mii, the Mii can be used as a participating character in certain Mii-oriented games such as Wii sports and Wii play. Mii's are customizable and allow the user to capture a likeness or caricature or capture the personality of themselves and others.

The disclosed arrangements can enhance interaction between a user and a VU in many ways by creating a way to place representations of real world objects into the VU. Allowing for a user to customize an avatar and objects in the VU enables a participant to create a unique persona and allows a user to tailor role-playing through this customized, simulated persona. The disclosed arrangements also allow objects to be "automatically" created and saved into the VU. The disclosed embodiments provide automatic and effortless creation of assets (e.g. money, art, etc.) that can be associated with an avatar and the avatar can take on a unique and more human-like persona. It can be appreciated that real life objects that give humans their unique presence can now be moved to the VU and these objects can be utilized to dictate other actions in the VU.

Figure 3:
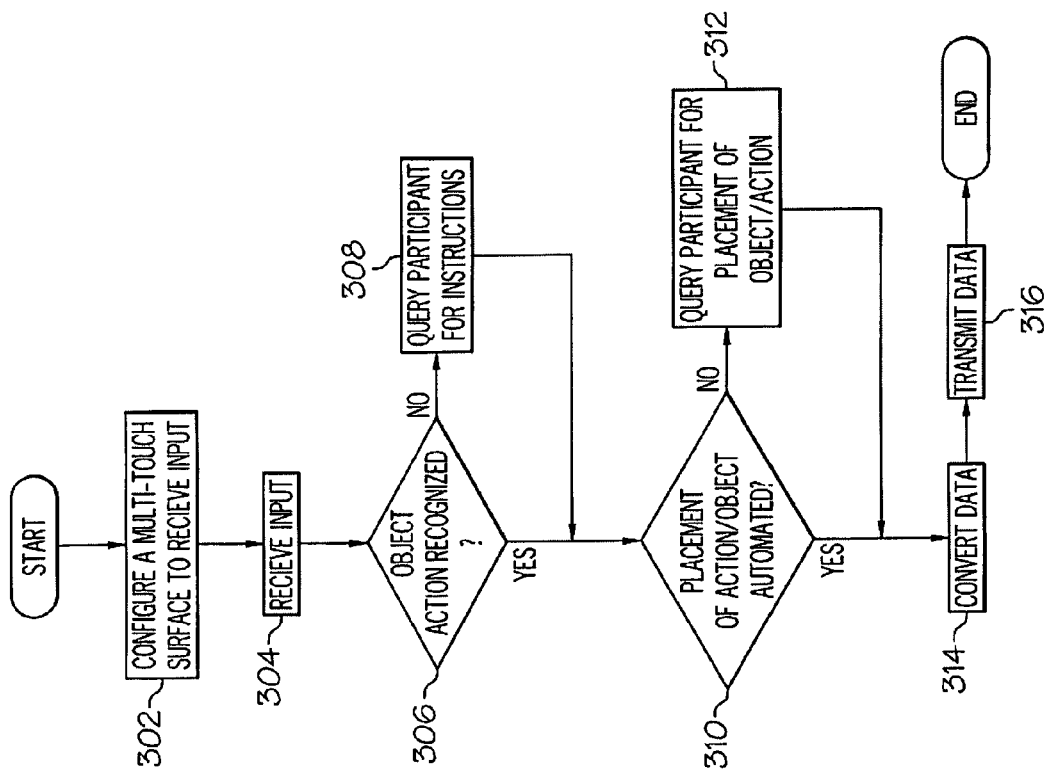
FIG. 3 is a flow diagram of a method for acquiring data representing an object and/or interactivity and for converting such data to data, format that is usable by a virtual universe application.

Referring to FIG. 3 a flow diagram 300 is illustrated for, converting real world objects/events into virtual universe objects/events. As illustrated by block 302, a multi-touch interactive system can be configured to receive input. As illustrated by block 304, the multi-touch interactive system can receive input such as placement of an object, a hand or arm gesture, and/or an action or activity associated with an object of a gesture by monitoring of an object or an interaction of a participant and can create, locate and/or retrieve data that is representative of such an object and/or interaction. Such an acquisition can be an automated process where multiple participants are concurrently providing such objects and/or interactions. Data can be acquired by the system such that each object and/or interaction can be recreated in some form in the VU. For example, acquired data can be utilized to locate and retrieve data that is provided to the VU service. As illustrated by decision block 306, the system can automatically determine whether it recognized the object and/or interaction. If the system does not recognize the object and/or interaction, then, the participant can be queried as to what the object and/or action is.

As illustrated by decision block 310, the system can automatically determine if the object and/or interaction can be identified such that the system can place the object in the VU in an appropriate location by an automated placement system. If automated placement cannot be determined, the participant can be queried as to where the object and/or interaction should be placed in the VU, as illustrated by block 312. When an object or an actions and a placement is determined, the imaged data can be automatically converted to data that is usable by a VU service provider, as illustrated by block 314. Such a data conversion could be a conversion from pixel data to coordinate data. The converted data can automatically be transmitted, to a VU server, as illustrated by block 316. The process can end thereafter. It can be appreciated that the visible matter can be automatically placed into a virtual world without user, involvement or significant delay. Accordingly, visible matter can be captured and in "real time" (notwithstanding processing and communication delays) the visible matter can be simulated or recreated in a VU.

An implementation of the process described above, may be stored on, or transmitted across some form of computer readable media. Computer readable media can be any available media that can be accessed by a computer. By way of example, and not limitation, computer readable media may comprise "computer storage media" and "communications media." "Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer. "Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also, included within the scope of computer readable media.

Reference to particular configurations of hardware and/or software, those of skill in the art will realize that embodiments may advantageously be implemented with other equivalent hardware and/or software, systems. Aspects of the disclosure described herein may be stored or distributed on computer-readable media, including magnetic and optically readable and removable computer disks, as well as distributed electronically over the Internet or over other networks, including wireless networks. Data structures and transmission of data (including wireless transmission) particular to aspects of the disclosure are also encompassed within the scope of the disclosure.

Each process disclosed herein can be implemented with a software program. The software programs described herein may be operated on any type of computer, such as personal computer, server, etc. Any programs may be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet, intranet or other networks. Such signal-bearing media, when carrying computer-readable instructions that direct the functions of the disclosed arrangements, represent embodiments of the present disclosure.

The disclosed embodiments can take the form of an entirely hardware embodiment, an entirely software embodiment or an embodiment containing both hardware and software elements. In some embodiments the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) of a propagation medium. Examples of a computer-readable medium include a semiconductor of solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A data processing system suitable for storing and/or executing program code can include at least one processor, logic, or a state machine coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

It is understood that the form of the invention shown and described in the detailed description and the drawings are to, be taken merely as examples. It is intended that the following claims be interpreted broadly to embrace all the variations of the example embodiments disclosed.

What is claimed is:

1. A method comprising;
   configuring a multi-touch interactive system to support concurrent interactions by multiple participants, the system detecting objects respectively associated with the participants and receiving input associated with the objects;
   acquiring data associated with one of the objects;
   associating the acquired data with one of the participants;
   associating a virtual universe with the acquired data;
   automatically converting the acquired data to data that is usable to render an avatar associated with said one participant interacting with a representation of the object in the virtual universe; and
   assigning an identifier to the acquired data such that the virtual universe compatible data is associable with the avatar.

2. The method of claim 1, further comprising automatically rendering the converted data in a virtual environment.

3. The method of claim 1, wherein the acquired data is one of metadata or pixel data.

4. The method of claim 1, further comprising simulating the object as a possession of the avatar.

5. The method of claim 1, further comprising acquiring participant input regarding the placement of the object in the virtual universe.

6. The method of claim 1, further transmitting the virtual universe compatible data and simulating the object in a virtual universe.

7. The method of claim 1, further comprising accepting a user input to classify the object.

8. The method of claim 1, wherein receiving comprises receiving image data from an optical recording device.

9. A system comprising:
   a multi-touch interactive system to support concurrent interactions by multiple participants;
   an object-interaction acquisition module implemented on a processor and coupled to the multi-touch interactive system to detect objects respectively associated with the participants, receive input associated with the objects, and acquire object image data associated with one of the objects;
   an identification module implemented on the processor to identify a participant associated with the object image data;
   an association module implemented on the processor to associate the object image data with the identified participant and to assign an identifier to the object image data such that the object image data is associable with an avatar of the identified participant;
   a data conversion module implemented on the processor to translate the object image data into virtual universe compatible format such that the object rendered in a virtual universe resembles the object in the real world; and
   a rendering module implemented on the processor to render the avatar of the identified participant interacting with the object.

10. The system of claim 9, further comprising a graphical user interface module implemented on the processor to provide user selectable inputs and to facilitate receiving user input.

11. The system of claim 9, wherein the object-interaction acquisition module comprises a transceiver.

12. The system of claim 9, wherein the object-interaction acquisition module comprises a pixel generator.

13. A machine-accessible storage medium containing instructions which, when the instructions are executed by a machine, cause said machine to perform operations, comprising:
   configuring a multi-touch interactive system to support concurrent interactions by multiple participants, the system detecting objects respectively associated with the participants and receiving input data associated with one of the objects and usable to create at least an image;
   associating the input data with a virtual universe;
   acquiring image data representing the object;
   converting the image data into data usable to create the virtual universe;
   assigning an identifier to the image data such that the image data is associable with an avatar; and
   rendering an avatar of the participant interacting with the object in the virtual universe.

14. The machine-accessible storage medium of claim 13, that when the instructions are executed cause the machine to receive a transmission and identify an object based on the received transmission.

15. The machine-accessible storage medium of claim 13, that when the instructions are executed cause the machine to simulate the object as a possession of the avatar.

* * * * *